Patented May 1, 1951

2,550,834

UNITED STATES PATENT OFFICE 2,550,834

AQUEOUS POLYCHLOROPRENE ADHESIVES AND METHODS OF PREPARING THE SAME

Alexander D. Macdonald, Newton, and Stanley L. Sprague, Westwood, Mass., assignors to B. B. Chemical Co., Boston, Mass., a corporation of Massachusetts No Drawing. Application June 1, 1946, Serial No. 673,902

12 Claims. (Cl. 260—27)

This invention relates to improved aqueous, polychloroprene containing adhesives and to methods of making the same.

Polychloroprene latex is a dispersion of polychloroprene in water prepared by polymerization of an emulsion of chloro-2-butadiene-1,3. As is well known, the polychloroprene latex coagulates when the latex is dried and forms a solid coherent material capable of adhering materials strongly together. It has been found, however, that polychloroprene latex compositions have not possessed a satisfactory degree of self-adherence so that when two surfaces are coated with the latex, and the coatings allowed to dry, a good bond has not resulted when the coated surfaces are pressed together. Also polychloroprene latex may not have sufficient tack to form an initial bond of the desired strength and may not give the desired type of adherence between the polychloroprene particles and certain surfaces which have been coated with the polychloroprene latex.

It is an object of the present invention to provide compositions comprising polychloroprene latex which are capable of forming coatings of improved self-adherency.

It is an additional object of the present invention to provide an improved aqueous adhesive comprising polychloroprene and possessing desirable tack and initial bond strength.

It is another object of the invention to provide an improved aqueous adhesive composition having improved tack and initial bond strength, and desirable application characteristics comprising polychloroprene and an acidic resinous material.

It is a further object of the invention to provide an aqueous adhesive composition having improved bonding and application characteristics and desirable stability comprising polychloroprene latex, dispersed particles of solid polychloroprene, and an acidic resinous material associated with the dispersed particles of solid polychloroprene.

It is a still further object of the invention to provide a new method for forming an adhesive comprising polychloroprene latex together with dispersed particles of solid polychloroprene associated with a resinous material.

We have developed a new adhesive composition having improved initial and permanent bonding strength comprising the combination of a polychloroprene latex with an aqueous dispersion of an acidic resin-polychloroprene composition. This resin-polychloroprene composition is obtained by melting polychloroprene in an acidic resinous material. To this resin-polychloroprene material while in fluid or plastic condition, there is added with agitation an aqueous liquid comprising a dispersing agent. The aqueous liquid initially disperses in the resin-polychloroprene mass, but a point in the addition is reached where phase inversion occurs and the aqueous phase becomes continuous and the resin-polychloroprene material becomes the disperse phase. This dispersion of resin and solid polychloroprene may be blended with polychloroprene latex in varying proportions up to about an equal volume of the dispersion to the volume of the latex to form our improved adhesive.

Although we do not wish to be bound by this theory, we believe that the resin content of the resin-polychloroprene dispersion may be disposed to a large extent as a coating on the polychloroprene particles present in the dispersion. In this position, the resin coacts with the polychloroprene both in the dispersion and in the latex to impart to a film of the composition improved tack and self-adherence which are important to make and maintain a firm adhesive bond. Also because of the association of the resin with the dispersed polychloroprene particles, there results a thicker body and increased viscosity so that the adhesive composition may readily be applied by conventional applying devices, such as a doctor knife or other known adhesive spreader.

In accordance with a preferred embodiment of our invention, an acidic resinous material is melted in an agitating device, for example, in a steam jacketed Werner-Pfleiderer mixer. The resinous material should have an acid number of at least about 100, and the acid number may be much higher. Also, the resinous material should have a melting point between about 75° C. and about 100° C. Examples of acidic resins which have been found suitable above or in resinous mixtures are WW rosin, Burgundy pitch, and polymerized terpene acids derived from rosins, for example a hard, brittle resin having a melting point of 100.5° C. and an acid number of 150 to 156 and a similar resin having a melting point of from about 112° C. to 118.5° C. Other resins or mixtures of these or other resins possessing the described chemical and physical characteristics may be used. A desirable additive which may be incorporated at this time is a saponified natural resin such as rosin combined with lime, zinc or both. Also preservatives and polychloroprene modifying agents, e. g., antioxidants or curing agents, may be added to the melted resin.

The molten resinous material in the mixer is maintained at a temperature of between about 100° C. and about 125° C. and polychloroprene is added with agitation and dissolved in the resinous material. Suitably there is dissolved from about 50% to 100% of polychloroprene based on the weight of the resinous material.

The resin-polychloroprene solution is agitated until the mass is homogeneous. A small quantity of water is then added with agitation to the heated solution and, of this water, a portion is evaporated and cools the resin-polychloroprene material, and the remainder is taken up by the resin-polychloroprene material. The temperature of the resin-polychloroprene material is maintained at between about 75° C. and about 85° C., to keep the material in fluid or plastic state and there is added with continued agitation an aqueous liquid containing a dispersing agent. Aqueous solutions of ammonium caseinate, preferably containing excess ammonia, have been found very satisfactory, but aqueous solutions of other dispersing agents may be used. For example, solutions of alkali caseinates, animal glue, or other similar known dispersing agents, may be used. The term alkali caseinates employed in the specification and claims includes ammonium caseinate.

The aqueous liquid initially is pulled into the liquid or plastic mass of resin-polychloroprene and disperses through the mass. However, a point is reached in the addition of aqueous liquid, usually when about two-thirds of the liquid has been added, where phase inversion occurs and the aqueous phase becomes continuous and the resin-polychloroprene material becomes the disperse phase. Further aqueous liquid is added until the mass becomes a viscous liquid comprising a dispersion of resin-polychloroprene composition in a continuous aqueous phase.

A polychloroprene latex, suitably a commercial latex containing from about 30% to about 50% solids, is stirred into the dispersion of resin-polychloroprene composition. The relative proportions of dispersion and latex may be varied depending on the proportions desired in the final product. Increasing the proportion of dispersion increases the tack but decreases somewhat the ultimate bond strength. We have found that satisfactory compositions may be prepared by combining up to about an equal volume of dispersion with the polychloroprene latex.

*Example.*—85 parts of WW rosin, 72 parts of a hard, brittle resin having a melting point of 101.5° C. and an acid number of 150, the resin being derived by polymerization of terpene acids derived from rosin, 13 parts of zinc-calcium resinate, and 7 parts of phenyl α- naphthylamine, a polychloroprene antioxidant, are melted together at 160° to 170° C. The mixture is stirred for about ½ hour at a temperature of 100° to 118° C. in a Werner-Pfleiderer mixer, after which 166 parts of solid all-purpose fast-curing type of polychloroprene having a plasticity of 108 to 115 as determined on the Williams plastometer are added. The mixture is acted on by the Werner-Pfleiderer mixer for three-quarters of an hour until the mass becomes homogeneous. Approximately 32 parts of tepid water are added and the mixture stirred for 10 minutes further during which time excess water vaporizes and the temperature of the mass is somewhat reduced. A small portion of the water becomes dispersed in the resin-polychloroprene mixture.

An ammonium-caseinate solution is prepared by dispersing 200 parts of acid-precipitated casein in 1000 parts of cold water and adding 90 parts of concentrated ammonium hydroxide (28% NH₃). This mixture is warmed with stirring to 60° C. until the mass thickens, forming a smooth homogeneous solution of ammonium caseinate.

About 90 parts of this solution are added slowly over a period of about 10 minutes to the resin-polychloroprene mixture in the Werner-Pfleiderer mixer and the addition product is agitated for a period of about one and one-half hours. Suitably a preservative, such as parachlorometacresol, is added with water at this point and when the preservative has been added, additional water is added to form about 580 parts by weight of the dispersion.

In preparing the desired blend of polychloroprene dispersion and polychloroprene latex, 76 parts by volume of a 50% solids polychloroprene latex are combined with 30 parts by volume of water. This mixture is added to 84 parts by volume of a polychloroprene dispersion, such as that prepared as described above, and the materials are combined by thorough agitation.

This composition has been found particularly satisfactory for securing together the ends of abrasive belts and in similar relations where strength, flexibility and resistance to heat are important.

It will be understood that the above example is added for purposes of illustration only and that the invention is not limited to details or proportions disclosed therein but is to be limited only by the language of the claims.

Having described our invention, what we claim as new and desire to secure by Letters Patent of the United States is:

1. An adhesive composition comprising a blend of polychloroprene latex and an aqueous dispersion comprising a continuous phase of an aqueous solution of a colloidal dispersing agent from the group consisting of alkali caseinates and animal glue, and a dispersed phase comprising the product of dissolving polychloroprene in from an equal weight up to twice its weight of a molten acidic resinous material at a temperature not exceeding 125° C., said resinous material having an acid number of between 100 and 170 and having a melting point between 75° C. and 100° C., the volume of said dispersion in the blend not exceeding the volume of the latex.

2. An adhesive composition comprising a blend of polychloroprene latex and an aqueous dispersion comprising a continuous phase of an aqueous solution of ammonia caseinate, and a dispersed phase comprising the product of incorporating polychloroprene in molten acidic resinous material comprising Burgundy pitch at a temperature not exceeding 125° C., said acidic resinous material having an acid number of between 100 and 170 and having a melting point between 75° C. and 100° C. and said polychloroprene and resinous material being in a ratio within the range of 1:1 to 1:2, the volume of said dispersion in the blend not exceeding the volume of the latex.

3. An adhesive composition comprising a blend of polychloroprene latex and an aqueous dispersion comprising a continuous phase of an aqueous solution of ammonium caseinate, and a dispersed phase comprising the product of dissolving polychloroprene in from an equal weight up to twice its weight of molten rosin at a temperature not exceeding 125° C., said rosin having an acid number between 100 and 170 and a melting point between 75° C. and 100° C., said polychloroprene and rosin being in a ratio within the range of 1:1 to 1:2, the volume of said dispersion in the blend not exceeding the volume of the latex.

4. An adhesive composition comprising a blend of polychloroprene latex and an aqueous dispersion comprising a continuous phase of an aqueous solution of ammonium caseinate, and a dispersed phase comprising the product of incorporating polychloroprene in a molten acidic resinous material at a temperature not exceeding 125° C., said resinous material comprising polymerized terpene acids derived from rosin, and having an acid number of between 100 and 170 and having a melting point between 75° C. and 100° C., said polychloreprene and resinous material being in the ratio within the range of 1:1 to 1:2, the volume of said dispersion in the blend not exceeding the volume of the latex.

5. A method of forming an adhesive composition comprising melting an acidic resinous material having an acid number between 100 and 170 and having a melting point between 75° C. and 100° C., dissolving solid polychloroprene in the molten material at a temperature not exceeding 125° C., adding with agitation an aqueous solution of a colloidal dispersing agent from the group consisting of alkali caseinates and animal glue to the resin-polychloroprene composition in quantity at least sufficient to cause said resin-polychloroprene material to become dispersed in the aqueous material, and incorporating the aqueous dispersion in a polychloroprene latex.

6. A method of forming an adhesive composition comprising melting an acidic resinous material from the group consisting of rosin, Burgundy pitch and polymerized terpene acids derived from rosin having an acid number between 100 and 170 and having a melting point between 75° C. and 100° C., and mixtures of these, maintaining the molten resinous material at a temperature not exceeding 125° C., dissolving solid polychloroprene in the molten material in amount from 50% to 100% by weight of the molten material, adding with agitation an aqueous solution of a colloidal dispersing agent from the group consisting of alkali caseinates and animal glue to the resin-polychloroprene composition in quantity at least sufficient to cause said resin-polychloroprene material to become dispersed in the aqueous material, and incorporating the aqueous dispersion with a polychloroprene latex, the volume of said dispersion incorporated not exceeding the volume of the latex.

7. A method of forming an adhesive composition comprising melting an acidic resinous material comprising rosin having an acid number between 100 and 170 and having a melting point between 75° C. and 100° C., maintaining said molten resinous material at a temperature not exceeding 125° C., dissolving solid polychloroprene in the molten material in amount from 50% to 100% by weight of the molten material, adding with agitation an aqueous solution of ammonium caseinate to the resin-polychloroprene composition in quantity at least sufficient to cause said resin-polychloroprene material to become dispersed in the aqueous material, and incorporating the aqueous dispersion with a polychloroprene latex, the volume of said dispersion incorporated not exceeding the volume of the latex.

8. A method of forming an adhesive composition comprising melting an acidic resinous material comprising Burgundy pitch having an acid number between 100 and 170 and having a melting point between 75° C. and 100° C., maintaining said molten resinous material at a temperature not exceeding 125° C., dissolving solid polychloroprene in the molten material in amount from 50% to 100% by weight of the molten material, adding with agitation an aqueous solution of ammonium caseinate to the resin-polychloroprene composition in quantity at least sufficient to cause said resin-polychloroprene material to become dispersed in the aqueous material, and incorporating the aqueous dispersion with a polychloroprene latex, the volume of said dispersion incorporated not exceeding the volume of the latex.

9. A method of forming an adhesive composition comprising melting an acidic resinous material comprising polymerized terpene acids derived from rosin having an acid number between 100 and 170 and having a melting point between 75° C. and 100° C., maintaining said molten resinous material at a temperature not exceeding 125° C., dissolving solid polychloroprene in the molten material in amount from 50% to 100% by weight of the molten material, adding with agitation an aqueous solution of ammonium caseinate to the resin-polychloroprene composition in quantity at least sufficient to cause said resin-polychloroprene material to become dispersed in the aqueous material, and incorporating the aqueous dispersion with a polychloroprene latex, the volume of said dispersion incorporated not exceeding the volume of the latex.

10. A method of forming an adhesive composition comprising melting an acidic resinous material having an acid number between 100 and 170 and having a melting point between 75° C. and 100° C., maintaining said molten resinous material at a temperature not exceeding 125° C., dissolving solid polychloroprene in the molten material in amount from 50% to 100% by weight of the molten material, and adding with agitation an aqueous solution of a member of the group consisting of alkali caseinates and animal glue to the resin-polychloroprene composition in quantity at least sufficient to cause said resin-polychloroprene material to become dispersed in the aqueous material.

11. An adhesive composition comprising a blend of polychloroprene latex and an aqueous dispersion comprising a continuous phase of an aqueous solution of a colloidal dispersing agent from the group consisting of alkali caseinates and animal glue, and a dispersed phase comprising the product of dissolving polychloroprene in from an equal weight up to twice its weight of a molten acidic resinous material from the group consisting of rosin, Burgundy pitch and polymerized terpene acids derived from rosin at a temperature not exceeding 125° C., said resinous material having an acid number of between 100 and 170 and having a melting point between 75° C. and 100° C. and mixtures of these, the volume of said dispersion in the blend not exceeding the volume of the latex.

12. The method of forming an adhesive composition comprising melting an acidic resinous material from the group consisting of rosin, Burgundy pitch and polymerized terpene acids derived from rosin having an acid number between 100 and 170 and having a melting point between 75° C. and 100° C. and mixtures of these, maintaining said molten material at a temperature not exceeding 125° C., dissolving solid polychloroprene in the molten material in amount from 50% to 100% by weight of the molten material, and adding with agitation an aqueous solution of ammonium caseinate to the resin-polychloroprene composition in quantity at least sufficient to cause said resin-polychloroprene material to become dispersed in the aqueous solution.

ALEXANDER D. MACDONALD.
STANLEY L. SPRAGUE.

REFERENCES CITED

The following references are of record in the file of this patent:

UNITED STATES PATENTS

| Number | Name | Date |
|---|---|---|
| 2,382,417 | Hendricks | Aug. 14, 1945 |

OTHER REFERENCES

"Neoprene Latex Type 571," Report No. 43-2, Feb. 1943, Du Pont Co., pp. 21-22.

"Neoprene Latex Type 571," Report No. 43-2, Feb. 1943, E. I. du Pont de Nemours and Co., pp. 17 and 24.